United States Patent [19]

Torrence

[11] Patent Number: 4,892,285
[45] Date of Patent: Jan. 9, 1990

[54] MODULATED ELECTRICALLY OPERATED REFRIGERANT EXPANSION VALVE

[75] Inventor: Robert J. Torrence, Addison, Ill.

[73] Assignee: Eaton Corporation, Cleveland, Ohio

[21] Appl. No.: 188,017

[22] Filed: Apr. 29, 1988

[51] Int. Cl.⁴ .............................................. F16K 31/06
[52] U.S. Cl. .......................... 251/129.05; 251/129.15; 251/65
[58] Field of Search ...................... 251/129.15, 129.05, 251/65

[56] References Cited

U.S. PATENT DOCUMENTS

| | | | |
|---|---|---|---|
| 3,420,496 | 1/1969 | Hallberg | 251/368 X |
| 3,588,039 | 6/1971 | Chelminski et al. | 251/129.15 |
| 4,056,255 | 11/1977 | Lace | 251/129.15 |
| 4,286,767 | 9/1981 | Hashimoto . | |
| 4,452,424 | 6/1984 | Kawata | 251/129.15 |
| 4,504,039 | 3/1985 | Akagi . | |
| 4,548,047 | 10/1985 | Hayashi et al. . | |

Primary Examiner—Arnold Rosenthal
Attorney, Agent, or Firm—R. A. Johnston

[57] ABSTRACT

A solenoid operated refrigerant expansion valve for providing control of refrigerant flow with a modulated electrical signal having a valve block with an armature guide post cantilevered therefrom with a tubular valve spool slidably received thereon and a cover thereover attached to the block which forms a valving chamber communicating with the inlet, the guide post has a cavity formed therein which communicates with the outlet and cross ports which are valved by movement of the spool. The free end of the guide post is registered in a recess formed in the cover. The cover has a controlled clearance over the valve member to provide viscous dampening thereof. A coil and pole frame are received over the cover and retained thereon.

25 Claims, 2 Drawing Sheets

MODULATED ELECTRICALLY OPERATED REFRIGERANT EXPANSION VALVE

CROSS-REFERENCES TO RELATED APPLICATIONS

This application is related to Ser. No. 119,009, filed Nov. 12, 1987 "Indicating Refrigerant Saturation Point" in the name of R.J. Torrence; Ser. No. 119,943, filed Nov. 13, 1987 "Superheat Control of Air Conditioning System Incorporating Fuel Cooler" in the name of M. B. Thompson and R.J. Torrence; and, Ser. No. 168,041, filed Mar. 14, 1988 "Controlling Superheat in a Refrigeration System" in the name of R.J. Torrence.

BACKGROUND OF THE INVENTION

The present invention relates to expansion valves for controlling flow of refrigerant between the exothermic heat exchanger or condenser and the endothermic heat exchanger or evaporator in a refrigeration or air conditioning system. Valves of this type are employed for creating a sufficient pressure drop and expansion of the refrigerant prior to entry into the evaporator.

One type of refrigerant expansion valve employed in air conditioning and refrigeration systems is a pressure operated temperature sensing device which responds to the temperature of the refrigerant to expand fluid in an enclosed chamber to act upon a diaphragm and control the position of a valve member. Such pressure operated refrigerant expansion valve responds to an existing temperature condition of the refrigerant; and; thus control of the refrigerant flow lags the temperature of the air to be refrigerated or conditioned in the compartment.

In stationary refrigeration or air conditioning systems, the rate of change of ambient conditions is generally slow and the response of the system is more than adequate with a pressure sensitive diaphragm expansion valve because the lag or delay is not significant with respect to the rate of change of ambient conditions.

However, in air conditioning systems employed for the passenger compartment of vehicles, ambient conditions change rapidly. In such applications, a valve which responds only to the temperature of the refrigerant cannot respond in sufficient time or anticipate changed conditions to provide the desired degree of refrigerant flow control necessary to maintain the desired regulation of passenger compartment temperature.

Therefore, it has long been desired to provide an electrically operated refrigerant expansion valve in a vehicle air conditioning system in order that the flow of refrigerant can be controlled in response to parameters other than a simple sensing of refrigerant temperature.

Examples of vehicle air conditioning systems employing electrically operated expansion valves and various electrical strategies for valve operation are shown and described in the above cross-referenced related applications. Where rapid response to changing ambient conditions is required for a vehicle air conditioning system, it has been found desirable to generate an electrical control signal providing for modulation of the electrically operated expansion valve by employing a width-modulated pulse signal of substantially constant frequency, or period and varying pulse width or providing a fractional duty cycle for proportional control of the valve opening and consequently proportional control of the refrigerant flow to the evaporator.

In providing electrically operated expansion valves for vehicle air conditioning systems, it has been found desirable to provide a relatively high frequency electrical control signal to accommodate the rapid changes in the varying load on the system. Where it has been found desirable to use an electrically operated expansion valve for controlling refrigerant flow, problems have been encountered in providing a valve which in the closed position would permit a small or limited amount of flow to the evaporator and yet could be proportionately controlled to provide a controlled amount of flow over a relatively wide range of flow.

A simple poppet type valve has the disadvantage that in the closed position, all flow is blocked and that a small amount of movement of the poppet from the fully closed position produces a sudden surge of flow which is extremely difficult to control at low rate of flow in the nearly closed position. Thus, it has long been desirable to find an electrically operated refrigerant expansion valve which provides good proportional control of flow over the desired range and also in the closed position provides a limited but controlled residual flow. It has further been desired to provide such a valve which is capable of extended use and continuous relatively high frequency cycling for extended periods of time without succumbing to leakage or stiction and also to provide such a valve which can be operated with relatively low power consumption at low voltage.

SUMMARY OF THE INVENTION

The present invention provides an electrically operated modulated refrigerant flow control valve for use in vehicle air conditioning systems. The valve assembly of the present invention employs a hollow tubular armature slidably received over a centrally disposed guide post cantilevered from the valve body. The central guide post has defines a cavity therein which communicates with the valve outlet; and, the guide post has ports formed through the wall of the cavity for valving refrigerant flow therethrough by sliding movement of the armature in response to energization of the solenoid coil. The armature is longitudinally suspended between springs in the closed position and a valving chamber is formed by a cover received over the armature and releasably attached to the valve body such that the valving chamber communicates with the body inlet port. The end of the cover remote from the body has a recess therein with the free end of the central guide post registered thereagainst for precise location and minimizing deflection thereof. The cover means has a controlled clearance about the armature such that liquid refrigerant disposed therebetween provides viscous damping of the armature movement.

In the preferred practice of the invention, the valving is energized at a relatively high frequency periodic electrical control signal in the form of a pulse having its width modulated to vary the ON time during each period of the control signal. The tubular valve member which comprises the armature is closely fitted over the central guide post with a controlled clearance such that the armature in the closed position covering the valving passage in the central guide post permits a limited amount of residual refrigerant flow to maintain a minimal flow of refrigerant for preventing compressor malfunction. Optionally, an annular permanent magnet is disposed axially adjacent the solenoid coil for enhancing the electromagnetic force of the coil on the armature.

The present invention provides a simple, reliable electrically modulated refrigerant expansion valve for controlling refrigerant flow in an automotive air conditioner with centrally guided pressure balanced spool valving. The unique construction of the present invention responds to a relatively high frequency control signal and yet provides quiet operation and utilizes the dithering of the periodic control signal to prevent frictional stiction of the valve.

DETAILED DESCRIPTION

Figure 1:
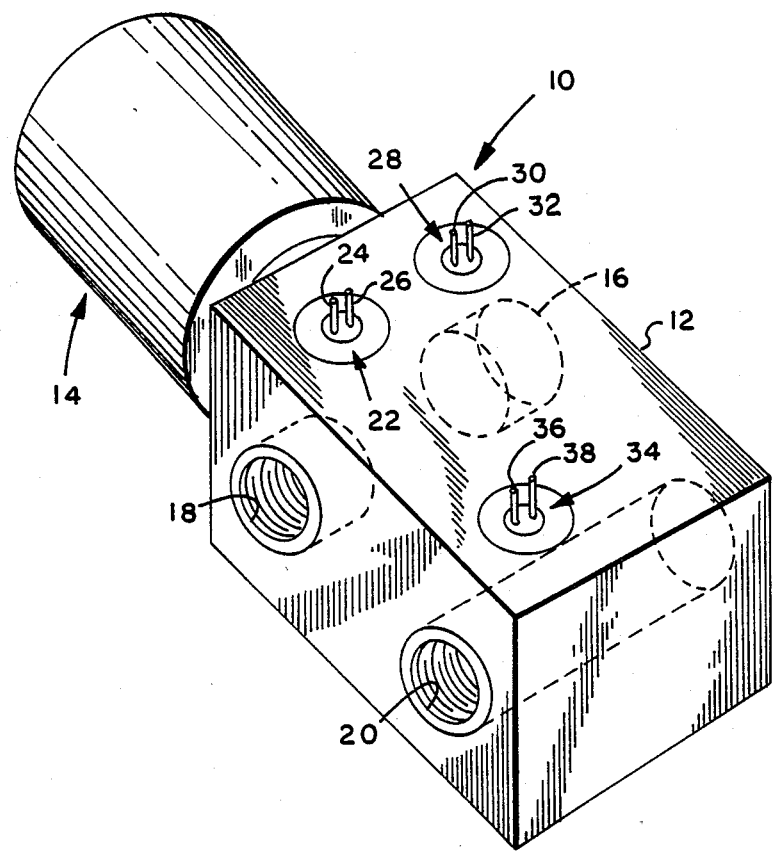
FIG. 1 is a somewhat perspective illustration of the valve assembly of the present invention; and, FIG. 2 is a top view of the valve assembly of FIG. 1 with portions thereof broken away to show the details of the working components of the solenoid and valving mechanism.

Referring to FIG. 1, the valve assembly is indicated generally at 10 and has a valve body 12 and a solenoid indicated generally at 14 which is attached to the end of the body 12. In the presently preferred practice, the body 12 is formed of aluminum material. The valve has an inlet port 16 (illustrated in dashed outline only in FIG. 1) formed on the distal side of the block 12 and an inlet port 18 formed on the opposite, or front side.

A thermistor 22 is provided on the top of the valve block 12 and has electrical terminals 24, 26 extending upwardly therefrom and has a resistance element (not shown) extending into the valve inlet 18. Similarly, a second thermistor 28 is mounted on the top of the block with electrical terminals 30, 32 extending therefrom and having a resistance sensing element (not shown) disposed to extend into the inlet port 16. A third thermistor 34 is disposed on the block 12 above a through-passage 20 formed on the end of the block remote from the solenoid 14 and thermistor 34 has a pair of electrical connectors 36, 38 extending upwardly therefrom and also has a resistance element (not shown) extending into the passage 20 for sensing the flow of refrigerant therethrough. The thermistor may be attached to the body in any convenient manner known in the art. In the presently preferred practice, the through-passage 20 is connected in the refrigerant circuit to have refrigerant discharged from the evaporator (not shown) flowing therethrough to the inlet of the compressor (not shown).

Figure 2:
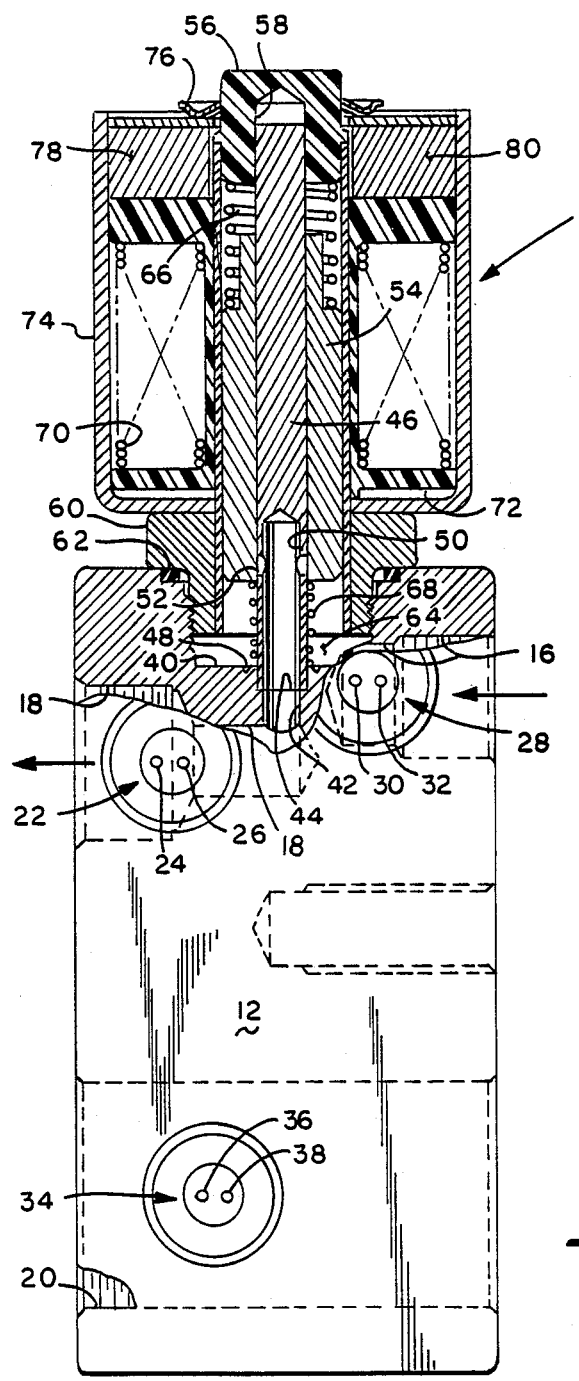

Referring to FIG. 2, the valve body 12 has a first counterbore 40 provided in the upper end thereof which intercepts and communicates with the inlet passage 16. A second passage or bore 42 is provided in the bottom of bore 40; and, the passage 42 communicates with the outlet passage 18. A smaller diameter counterbore 44 is provided in the center of the bottom of counterbore 40 and the counterbore 44 has received therein one end of an armature guide post 46 which is retained therein by any suitable means, as for example, metal staking indicated by reference numeral 48. The guide post 46 has formed in the lower end thereof a cavity 50 provided by drilling the end thereof and a valving passage 52 is provided therein by cross-drilling. The cavity 50 communicates with the outlet passage 44. In the presently preferred practice, guide post 46 is formed of non-magnetic stainless steel.

A tubular ferromagnetic armature and valving member 54 is received over the guide post 46 and is slidably movable thereon. The valving member 54 is shown in solid outline in FIG. 2 in the closed position wherein the lower end of the valving member 54 covers valving passage or the cross-ports 52. It will be understood that the member 54 is slidably movable on post 46 in an upward direction to a second or open position wherein the end of the member 54 at least partially uncovers the ports 52.

Valve member 54 is slidably fitted over guide post 46 in a precision controlled clearance fit to provide a limited amount of flow through passage 52 when the valve member is in the closed position shown in FIG. 2. In the presently preferred practice, for an automotive passenger compartment air conditioning system, the valve member is fitted on post 46 to provide about 4,000/BTU/Hr refrigerant flow in the closed position.

A cover means 56 is received over the armature and has a recess or bore 58 provided in the upper portion of the inner wall thereof, which recess 58 have the upper end of post 46 received and registered therein in closely fitting arrangement such that the recess 58 functions to locate and prevent deflection or lateral movement of the upper end of the guide post 46. The lower end of the cover 56 has a collar or enlarged flange portion 60 provided thereon which collar or flange is threadably engaged in the counterbore 40 and sealed therearound by a suitable seal ring 62. The cover means 56 thus surrounds the valving member 54 and guide post to form a valving chamber 64 which is connected to inlet passage 16.

Solenoid 14 includes a coiled conductor 70 wound on bobbin 72 with a ferromagnetic pole frame 74 disposed therearound. The solenoid is received over cover means 56 and retained therein by suitable friction fastener 76. Optionally permanent magnet segments 78, 80 may be provided axially adjacent coil 70 for enhancing the magnetomotive force exerted on armature 54.

In the presently preferred practice, the inner diameter of the cover 56 is closely fitted about the outer diameter of the valving member 54 to provide a controlled clearance therebetween for providing viscous dampening of the movement of the valving member by the presence of the liquid refrigerant in the controlled clearance. In the present practice of the invention, a diametral clearance on the order of 0.010 inches (0.254 millimeter) has been found satisfactory.

The movable valving member 54 is biased towards the downward or closed position as illustrated in FIG. 2 by a spring 66 having one end registered against the undersurface of the closed end of cover 56 and the other end registered against a shoulder provided on the upper end of valving member 54. A resilient limit stop for downward movement of the valving member 54 is provided by a second spring 68 which is received over the guide post 46. Spring 68 has the lower end thereof registered against the bottom of counterbore 40 and the upper end thereof registered against the lower end of the valving member 54.

The valving member 54 is thus suspended between the spring 66 and 68. The free length of the lower spring 68 is chosen, in the presently preferred practice, such that the spring 68 exerts no force against the valving member 54 when the valving member moves from the closed to the open position. It will be understood that spring 68 thus has a higher spring constant, e.g. is a stiffer spring, than the upper spring 66, the lower spring 68 is thus operable to begin to exert a force on the valving member 54 only after the spring 66 has moved the valving member 54 to the closed position.

In operation, with the valve member 54 in the closed position covering the valving passage 52 and in force equilibrium between springs 66 and 68, energization of the coil 14 by the desired periodic control signal, preferably pulsed in the frequency range 32-64 Hertz, but optionally 30-130 Hertz, the armature is moved upward, uncovering passage 52 by varying amounts to provide the desired rate of flow between inlet 16 and outlet 18.

The present invention thus provides a low voltage electromagnetically operated refrigerant expansion valving have a pressure balanced, spring suspended valving spool movement of which dampened by viscous forces of refrigerant surrounding the valving member. The unique construction of the present valve provides quiet and extended-life operation when energized by a relatively high frequency pulse control signal and enables proportional control of refrigerant to the evaporator of a refrigeration or air conditioning system.

The invention has been hereinabove described with respect to the illustrated embodiment; however, it will be understood that the invention is capable of modification and variation therefrom, and is limited only by the following claims.

I claim:

1. An electromagnetically operated valve assembly for use in controlling flow of compressed refrigerant in a refrigeration system, said assembly comprising:
   (a) valve body means defining an inlet and outlet port;
   (b) armature housing means formed of non-magnetic material attached to said body means and defining a valving chamber, said chamber communicating with said inlet port;
   (c) an armature guide formed of non-magnetic material extending from said housing means, said guide defining a cavity therein, said cavity communicating with said outlet port and having at least one port therein communicating said cavity with said valving chamber;
   (d) a hollow tubular armature formed of magnetic material and open at both ends received over said guide in closely fitting slidably movable arrangement with said guide extending therethrough, said armature movable between a first position covering said at least one port and any one of a plurality of second positions each at least partially uncovering at least one port, said armature in said closed position operative to provide a desired minimal residual refrigerant flow for compressor lubrication;
   (e) means resiliently biasing said armature to said first position and limit means operable to resiliently oppose in the closed position movement of said armature in the direction of said bias;
   (f) coil means disposed about said armature housing and operable upon electrical energization to provide sufficient magnetomotive force to move said armature from said first to any one of said second positions; and,
   (g) pole frame means operable for completing a magnetic flux loop about said coil and through said armature and including a permanent magnet disposed about the exterior periphery of said armature housing means axially spaced from said armature, said magnet disposed exclusively about a periphery greater than the outer periphery of said armature.

2. The valve assembly defined in claim 1, wherein said armature guide has two cross ports disposed in diametrically opposite arrangement.

3. The valve assembly defined in claim 1, wherein said armature housing has a recess formed in said chamber with one end of said armature guide received therein for locating said end in said armature housing.

4. The valve assembly defined in claim 1, wherein said means resiliently resisting said bias comprises a coil spring having the free length thereof generally set with the end of said armature in said first position.

5. The valve assembly defined in claim 1, wherein said means resisting said directional bias is operative only in armature second position;

6. The valve assembly defined in claim 1, wherein said armature housing is releasably attached to said valve housing;

7. The valve assembly defined in claim 1, wherein said armature in said second position is axially in force equilibrium between said magnetomotive force and the force of said resilient bias.

8. An electromagnetically operated valve assembly for use in controlling flow of compressed refrigerant in a refrigeration system characterized in that, said assembly has
   (a) a body means defining an inlet and an outlet port;
   (b) non-magnetic armature guide means attached to said body means and defining a valving cavity communicating with said outlet and defining at least one valving port;
   (c) a hollow spool valve formed of material of high magnetic permeability open at opposite ends and received over and slidably movable on said guide, between a closed position covering and one of a plurality of open positions each at least partially uncovering said valving port in said valving cavity, for providing controlled fluid communication with said inlet port, said spool valve operable in said closed position to provide a desired minimal residual refrigerant flow for compressor lubrication;
   (d) first resilient means operative to bias said spool toward said closed position and second resilient means operative to limit movement of said spool in said closed position;
   (e) cover means attached to said body means and providing a fluid pressure sealed valving chamber about said guide and spool and defining a flow path between said valving port and said inlet port, said cover means formed of non-magnetic material; and
   (f) magnetomotive force means operative upon energization to move said spool valve against said bias means from said closed to one of said open positions and including a magnetizable member disposed about the exterior periphery of said cover means axially spaced from said spool valve, said magnetizable member disposed exclusively about a periphery greater than the outer periphery of said spool valve.

9. The valve assembly defined in claim 8, wherein said magnetomotive force means includes a permanent magnet and a solenoid coil.

10. The valve assembly defined in claim 8, wherein said magneto force means includes a solenoid coil and an annular permanent magnet disposed in axially spaced arrangement on a common axis.

11. The valve assembly defined in claim 8, wherein said armature guide means is releasably attached to said body means.

12. The valve assembly defined in claim 8, wherein said spool is slidably fitted over said at least one port with a controlled clearance such that a predetermined maximum bleed flow is provided therebetween when said armature is in said first or closed position.

13. The valve assembly defined in claim 8, wherein said second bias means provides zero bias in armature second position.

14. The valve assembly defined in claim 8, wherein said cover means is releasably attached to said body means.

15. The valve assembly defined in claim 8, wherein said magnetomotive force means is retained on said cover means by friction engaging fastening means.

16. The valve assembly defined in claim 8 wherein said guide is formed of non-magnetic corrosion resistant steel.

17. The valve assembly defined in claim 8, wherein said cover means is formed of non-magnetic corrosion resistant steel.

18. The valve assembly defined in claim 8, wherein said body is formed of aluminum.

19. The valve assembly defined in claim 8, wherein said cover means is received over said tubular armature in a controlled clearance closely fitting arrangement such that refrigerant in said clearance is operative to provide viscous dampening of movement of said armature.

20. The valve assembly defined in claim 8, wherein said magnetomotive force means includes pole frame means having an annular permanent magnet.

21. The valve assembly defined in claim 8, wherein said magnetomotive force means includes a coil received over said cover means, and pole frame means defining, with said armature, a magnetic loop about said coil.

22. The valve assembly defined in claim 8, wherein said cover means is threadedly attached to said body means.

23. The valve assembly defined in claim 8, wherein said magnetomotive force means includes a ferromagnetic pole frame slidably received over said cover means.

24. The valve assembly defined in claim 8, wherein said magnetomotive force means includes a coil and a ferromagnetic force means includes a coil and a ferromagnetic pole frame as a sub-assembly slidably received on said cover means and retained thereon.

25. An electromagnetically operated valve assembly for use in controlling flow of refrigerant in a refrigeration or air conditioning system, said assembly comprising:
(a) body means defining an inlet port and an outlet port;
(b) armature guide means attached to said body means at one end thereof and having a cavity formed therein, said cavity communicating with said outlet, said armature guide means defining a valving passage communicating with said cavity through the wall thereof;
(c) a tubular valve member open at both ends slidably received over said guide means in closely fitting arrangement, said valve member formed of magnetic material and movable between a first position blocking said valving passage and one of a plurality of a second positions permitting flow through said passage to said cavity and said outlet;
(d) means biasing said valve member to said first position;
(e) cover means formed of non-magnetic material received over said valve member and said guide means, said cover means attached to said body means and defining a valving chamber communicating with said inlet and with said valving passage when said valve member is in one of said second positions, said cover means having the end of said guide means remote from said body means registered thereagainst for support thereon;
(f) limit means operable to resiliently resist movement of said valve member in the direction of said bias only when said valve member is in said first position; and
(g) electromagnetic means received over said cover means, and operable upon electrical energization to move said valve member alternately between said first and one of said second positions.

* * * * *